United States Patent
Tanida

(10) Patent No.: US 12,228,474 B2
(45) Date of Patent: Feb. 18, 2025

(54) LEAKAGE DETECTOR

(71) Applicant: AISAN KOGYO KABUSHIKI KAISHA, Obu (JP)

(72) Inventor: Yuya Tanida, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 301 days.

(21) Appl. No.: 17/871,039

(22) Filed: Jul. 22, 2022

(65) Prior Publication Data

US 2023/0043915 A1    Feb. 9, 2023

(30) Foreign Application Priority Data

Aug. 5, 2021    (JP) .................. 2021-129132

(51) Int. Cl.
   *G01M 3/32*    (2006.01)
   *F02M 25/08*   (2006.01)

(52) U.S. Cl.
   CPC ........ *G01M 3/3236* (2013.01); *G01M 3/3209* (2013.01); *F02M 25/0818* (2013.01)

(58) Field of Classification Search
   CPC .............. G01M 3/3209; G01M 3/3236; F02M 25/0818
   USPC ........................ 73/49.2, 49.7, 114.38, 114.39
   See application file for complete search history.

(56) References Cited

U.S. PATENT DOCUMENTS

| | | | |
|---|---|---|---|
| 6,474,148 B2 * | 11/2002 | Takagi | F02M 25/0818 73/114.38 |
| 6,698,280 B1 * | 3/2004 | Iden | F02M 25/0818 73/114.38 |
| 6,848,298 B2 * | 2/2005 | Miyahara | F02M 25/0818 702/51 |
| 6,945,093 B2 | 9/2005 | Amano et al. | |
| 6,964,193 B2 | 11/2005 | Kobayashi et al. | |
| 6,988,391 B2 | 1/2006 | Amano et al. | |
| 7,165,447 B2 | 1/2007 | Miyahara et al. | |

(Continued)

FOREIGN PATENT DOCUMENTS

| | | | |
|---|---|---|---|
| JP | 11351078 A | * | 12/1999 |
| JP | 2004162685 A | | 6/2004 |

(Continued)

OTHER PUBLICATIONS

Japanese Office Action dated Jun. 25, 2024, for Japanese Application No. 2021-129132 (10 p.).

*Primary Examiner* — John Fitzgerald
(74) *Attorney, Agent, or Firm* — CONLEY ROSE, P.C.

(57) ABSTRACT

A leakage detector for a fuel vapor processing system having a canister. The leakage detector includes a sealing system and a control unit. The sealing system is connected to the canister and is configured to sealingly close an inspection area, which includes the canister. The control unit is implemented by at least one programmed processor. The control unit is configured to calculate an amount of fuel vapor in the canister. The control unit is also configured to select a leakage detection method from the group consisting of a positive pressure type and a negative pressure type. The selection is made based on the calculated amount of the fuel vapor in the canister. The control unit is further configured to perform the leakage detection method in response to temporal changes in an internal pressure of the inspection area closed by the sealing system.

12 Claims, 8 Drawing Sheets

(56) References Cited

U.S. PATENT DOCUMENTS

| | | | | |
|---|---|---|---|---|
| 7,290,535 B2* | 11/2007 | Kimura | .............. | F02M 25/0818 |
| | | | | 73/40 |
| 8,347,691 B2* | 1/2013 | Makino | .............. | F02M 25/0836 |
| | | | | 73/49.7 |
| 8,683,852 B2* | 4/2014 | Makino | .............. | F02M 25/0836 |
| | | | | 123/518 |
| 8,950,244 B2* | 2/2015 | Nishimura | ......... | F02M 25/0809 |
| | | | | 73/49.7 |
| 11,326,559 B2* | 5/2022 | Nakagawa | ......... | F02M 25/0836 |
| 11,852,107 B2* | 12/2023 | Tanida | ............... | F02M 25/0818 |
| 2005/0217348 A1* | 10/2005 | Amano | ................ | F02M 25/089 |
| | | | | 73/49.7 |
| 2010/0288021 A1* | 11/2010 | Makino | .............. | F02M 25/0836 |
| | | | | 73/40.7 |
| 2011/0186020 A1* | 8/2011 | Makino | ................ | F02M 33/02 |
| | | | | 123/521 |
| 2015/0226630 A1 | 8/2015 | Nakagawa | | |

FOREIGN PATENT DOCUMENTS

| | | |
|---|---|---|
| JP | 2005030334 A | 2/2005 |
| JP | 2005299560 A | 10/2005 |
| JP | 2013019396 A | 1/2013 |
| WO | 2014/061135 A1 | 9/2016 |

\* cited by examiner

LEAKAGE DETECTOR

CROSS-REFERENCE TO RELATED APPLICATIONS

This application claims priority to Japanese patent application serial number 2021-129132, filed Aug. 5, 2021, which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to leakage detectors for fuel vapor processing systems.

A vehicle having an internal combustion engine is normally equipped with a fuel vapor processing system. The fuel vapor processing system has a canister for adsorbing fuel vapor evaporated in the fuel tank, and is configured to purge the fuel vapor from the canister to an intake pipe of the engine while the engine is running. One type of fuel vapor processing system includes a leakage detector configured to automatically determine whether an inspection area including the fuel tank, the canister, and/or a peripheral area of the fuel tank and canister has an opening or not.

SUMMARY

In one aspect of this disclosure, a leakage detector for a fuel vapor processing system includes a sealing system and a control unit. The fuel vapor processing system has a canister. The sealing system is connected to the canister and is configured to sealingly close an inspection area that includes the canister. The control unit comprises at least one programmed processor. The control unit is configured to calculate an amount of a fuel vapor in the canister. The control unit is also configured to select a leakage detection method from a group consisting of a positive pressure type method and a negative pressure type method. The selection may be made based on the calculated amount of fuel vapor in the canister. The control unit is also configured to perform the selected leakage detection method in response to temporal changes in an internal pressure of the inspection area closed by the sealing system. In accordance with this approach, it is possible to suppress or minimize a reduction in the accuracy of the leakage detection, which may otherwise occur when a large amount of fuel vapor exists in the canister.

DETAILED DESCRIPTION

International Publication No. WO2014/061135 discloses one type of leakage detector for a fuel vapor processing system. The leakage detection method carried out by the leakage detector includes a positive pressure type method and a negative pressure type method. In a case of the positive pressure type method, the pressure in an inspection area is forcibly increased by introducing a fluid into the fuel vapor processing system, and then the inspection area is sealingly closed in a state where the internal pressure of the inspection area is positive. Next, it is determined whether the inspection area has an opening from the speed of the drop in internal pressure of the inspection area toward atmospheric pressure, or the like. In a case of the negative pressure type method, the leakage detection can be performed based on the speed at which the internal pressure of the inspection area increases after forcibly applying negative pressure to the inspection area.

The amount of the fuel vapor adsorbed on a surface of an adsorbent, such as activated carbon, in a canister varies depending on the concentration of the fuel vapor, which substantially corresponds to the fuel vapor partial pressure, in a surrounding gaseous layer. Adsorption isotherms of various adsorbents are known. Each of the adsorption isotherms shows that a saturated (equilibrium) adsorption amount of a fluid depends on a concentration of the fluid at constant temperature. Thus, for example, when a negative pressure is applied to a canister for performing the leakage detection with the canister being in a state in which a large amount of the fuel vapor has been adsorbed, the fuel vapor may desorb from the adsorbent of the canister so as to enter an equilibrium state. When fuel vapor desorbs from the adsorbent in the canister or when additional fuel vapor adsorbs on the adsorbent in the canister, the internal pressure of the inspection area changes. There is a possibility that such changes in the internal pressure may affect the accuracy of the leakage detection. Therefore, there has been a need for an improved leakage detector.

Figure 1:
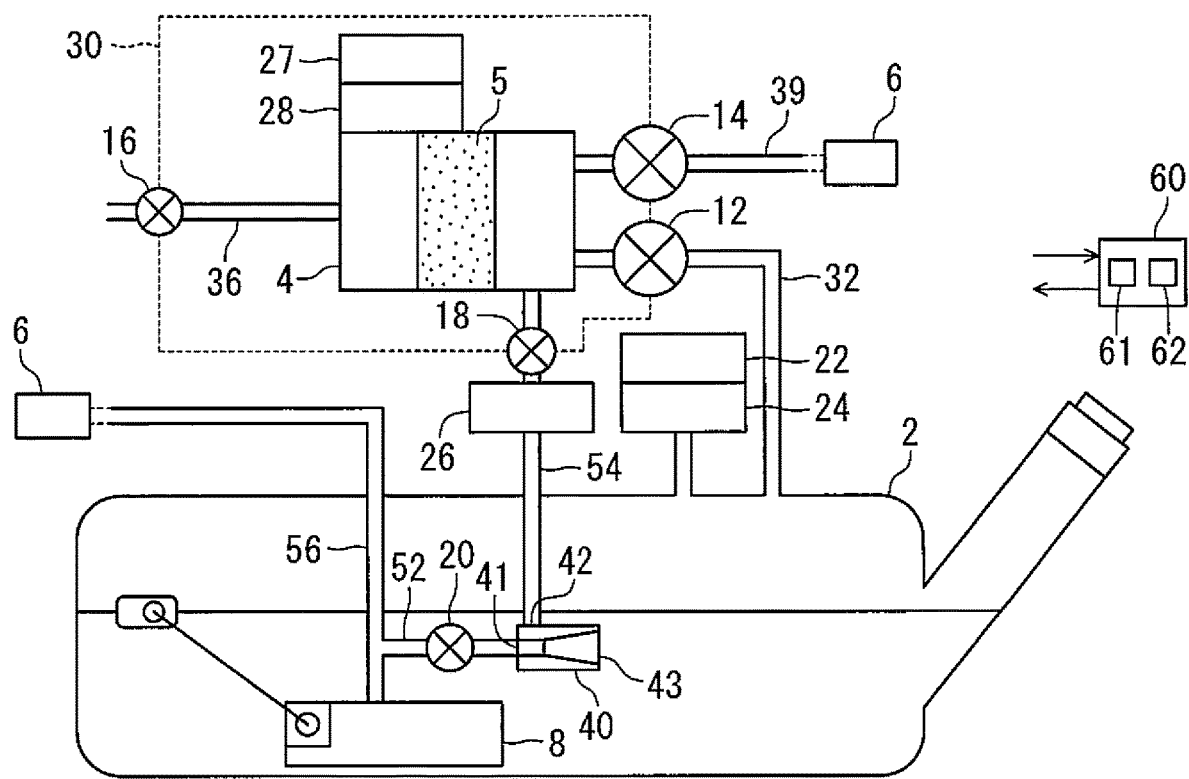
FIG. 1 is a schematic view of an embodiment of a fuel vapor processing system including a leakage detector in accordance with the principles described herein.

An embodiment of a fuel vapor processing system in accordance with the principles described herein will now be described. FIG. 1 shows the embodiment of the fuel vapor processing system. The fuel vapor processing system shown in FIG. 1 is configured to be mounted on a vehicle having an engine 6. The engine 6 may be a gasoline engine, a diesel engine, or the like. The fuel vapor processing system includes a fuel tank 2 and a canister 4, which is configured to temporarily retain fuel vapor evaporated in the fuel tank 2. A vapor passage 32 is connected to a tank port of the canister 4 such that the canister 4 is in selective fluid communication with a gaseous layer in the fuel tank 2 via the vapor passage 32. An atmospheric passage 36 has a first end connected to an atmospheric port of the canister 4 and a second end that is open to the atmosphere. Thus, the canister 4 is in selective fluid communication with the atmosphere via the atmospheric passage 36. The atmospheric passage 36 is provided with an atmospheric valve 16 near the second end thereof to control the fluid communication through the atmospheric passage 36. The canister 4 houses an adsorbent layer 5 configured to adsorb and desorb fuel vapor. The adsorbent layer 5 contains an adsorbent, such as activated carbon. A closing valve 12 is provided in the middle of the vapor passage 32 to control the fluid communication through the vapor passage 32. When the pressure of a gaseous mixture in the fuel tank 2, which may contain air and fuel vapor, is higher than the atmospheric pressure in a state where the closing valve 12 and the atmospheric valve 16 are open, the gaseous mixture flows from the fuel tank 2 to the canister 4 through the vapor passage 32. As a result, the fuel vapor in the gaseous mixture is adsorbed on the adsorbent layer 5 of the canister 4. The canister 4 includes a temperature sensor 27 and a pressure sensor 28. The temperature sensor 27 is configured to measure temperature within the canister 4. The pressure sensor 28 is configured to measure pressure within the canister 4.

A purge passage 39 has a first end connected to a purge port of the canister 4 and a second end connected to an intake passage of the engine 6. The first end of the purge passage 39 is in fluid communication with the tank side of the adsorbent layer 5. The second end of the purge passage 39 is in fluid communication with the intake passage of the engine 6. A purge control valve 14 is provided in the middle of the purge passage 39 to control fluid flow therethrough. While the engine 6 is running in a state where the purge control valve 14 and the atmospheric valve 16 are open, the fuel vapor adsorbed on the adsorbent of the canister 4 is purged from the canister 4 and is suctioned into the engine 6 due to the intake negative pressure of the engine 6. Then, the fuel vapor is burned in the engine 6.

A fuel pump 8 is disposed at a bottom of the fuel tank 2. The fuel pump 8 supplies liquid fuel stored in the fuel tank 2 to the engine 6. The liquid fuel pumped by the fuel pump 8 flows through a fuel supply passage 56 and then is injected into the intake pipe of the engine 6 from an injector or the like. The fuel tank 2 includes a temperature sensor 22 and a pressure sensor 24, which are configured to measure the temperature and pressure of the gaseous layer within the fuel tank 2, respectively.

As shown in FIG. 1, the fuel tank 2 houses an aspirator 40 configured to draw a fluid from the canister 4 into the fuel tank 2. The aspirator 40 operates based on the flow of high-pressure fuel discharged from the fuel pump 8. A branch passage 52 extends from the fuel supply passage 56 for introducing a part of the fuel discharged from the fuel pump 8 to the aspirator 40. A branch valve 20 is provided in the middle of the branch passage 52. The aspirator 40 has a suction port 42 connected to a suction passage 54. The suction passage 54 is connected to the canister 4 such that the aspirator 40 is in selective fluid communication with the tank side of the adsorbent layer 5 via the suction passage 54. A shut-off valve 18 is provided in the middle of the suction passage 54 to selectively control fluid flow therethrough.

Although not illustrated, the aspirator 40 includes a converging part, a diverging part (which is also referred to as diffuser), and a restriction part disposed between the converging part and the diverging part. The converging part comprises a gradually narrowing flow passage area in a flow direction of the fuel. The diverging part comprises a gradually expanding flow passage area in the flow direction. The restriction part comprises a flow passage having the smallest flow passage area of the converging and diverging parts. The aspirator 40 includes a nozzle configured to jet the fuel toward the restriction part. Accordingly, a part of the fuel pumped by the fuel pump 8 is introduced into the aspirator 40 via the branch passage 52 and an inlet port 41 of the aspirator 40. The fuel introduced into the aspirator 40 is jetted from the nozzle through the converging part and toward the restriction part at a high velocity. At that time, because the fuel flows through the part of flow passage having a gradually decreasing cross-sectional area, a decompression space is formed around the fuel flow via a Venturi effect, thereby generating a vacuum. Thus, a suction force is applied to both the suction passage 54 and the canister 4, which are in fluid communication with the decompression space in the aspirator 40. The fluid in the canister 4, such as a gaseous mixture containing the fuel vapor in the canister 4, is drawn through the suction passage 54 and the suction port 42. The fluid then flows through the diffuser together with the fuel jetted from the nozzle and is discharged from a discharge port 43 back into the fuel tank 2. In this embodiment, a pressure sensor 26 is provided along the middle of the suction passage 54. The pressure sensor 26 can be used, for example, to determine a saturation vapor characteristic of the fuel based on the pressure in the decompression space of the aspirator 40.

As shown in FIG. 1, the leakage detector includes an electronic control unit (ECU) 60 having a processor 61 and a memory 62. The ECU 60 is configured to receive signals from various sensors including the temperature sensors 22, 27 and the pressure sensors 24, 26, 28. Further, the ECU 60 is configured to transmit control signals to various electric devices including the fuel pump 8, the closing valve 12, the purge control valve 14, the atmospheric valve 16, the shut-off valve 18, and the branch valve 20, so as to control operations thereof.

Figure 2:
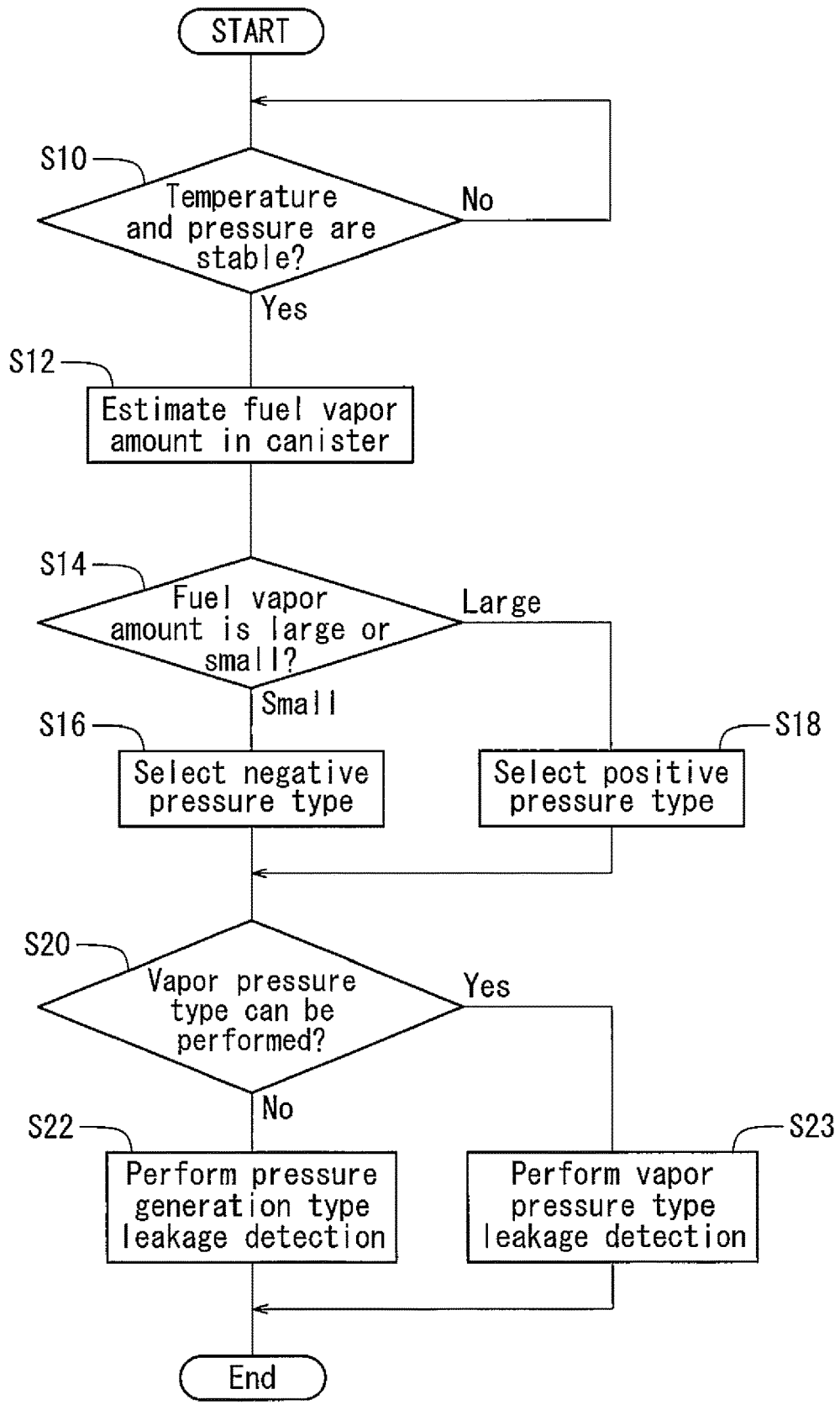
FIG. 2 is a flowchart illustrating a method for selecting a leakage detection method with the leakage detector of FIG. 1.

FIG. 2 is a flowchart showing an embodiment of a leakage detection method described in more detail below. The processor 61 of the ECU 60 is configured to execute programs stored in the memory 62, so as to perform the leakage detection method. For example, when a stop of the engine 6 (or key-off) has been detected, the leakage detection method is started. Since an inspection area 30 is required to be sealingly closed for carrying out the leakage detection with respect to the inspection area 30, the ECU 60 selectively closes some valves. As shown in FIG. 1, in this embodiment, the inspection area 30 is illustrated by a dotted line includes the canister 4 and does not include the fuel tank 2. Accordingly, in this embodiment, the ECU 60 is configured to close the closing valve 12, the purge control valve 14, the atmospheric valve 16, and the shut-off valve 18, so as to sealingly close the inspection area 30. The closing valve 12, the purge control valve 14, the atmospheric valve 16, and the shut-off valve 18 may collectively referred to as a "sealing system" that can be selectively and controllably closed to effectively seal the inspection area 30, which includes the canister 4 in this embodiment, from the surrounding atmosphere and other components of the fuel vapor processing system. In some embodiment, the inspection area 30 may include both the fuel tank 2 and the canister 4. In such case, the purge control valve 14, the atmospheric valve 16, and the shut-off valve 18 may be closed, and the closing valve 12 may be open. In some embodiments of a non-sealed tank system, for instance one which may not have a closing valve 12, a closed space including both the fuel tank 2 and the canister 4 is an object for leakage detection. Depending on the configuration and/or depending on which portions of the vapor processing system are to be included in the inspection area 30, the sealing system may contain fewer or more components than those listed above.

In this embodiment, the leakage detection method may be classified into a vapor pressure type method and a pressure generation type method. Further, the leakage detection method of this embodiment may also be divided into a positive pressure type method and a negative pressure type method. The vapor pressure type method can be performed without forcible application of pressure to the inspection area 30, for instance when a total pressure in a system, including the fuel vapor pressure naturally generated, reaches at least a predetermined positive pressure or a predetermined negative pressure. In a case of the pressure generation type method, a positive pressure or negative pressure is forcibly generated and applied to the inspection area 30. In a case of the negative pressure type method, the system may directly determine whether atmospheric air inflows into the closed inspection area 30 or not. However, because one purpose of the diagnosis is to determine whether there is a possibility that the fuel vapor could leak out from the inspection area and into the atmosphere, the negative pressure type method may be referred to as "negative pressure type leakage detection" in this disclosure.

As shown in FIG. 2, first it is determined whether a predetermined condition for performing a leakage detection has been met. In Step S10, it is determined whether the amount of change in temperature and the amount of change in pressure in the inspection area 30 within a predetermined time are less than corresponding prescribed values. When the condition is not met, the process may wait for achievement of the condition.

Next, the process proceeds toward a step for selecting a type of leakage detection. In this embodiment, the type of the leakage detection is selected from a positive pressure type and a negative pressure type. This selection may be done in response to the amount of fuel vapor in the canister 4. The fuel vapor in the canister 4 includes the fuel vapor adsorbed on the surface of the adsorbent of the adsorbent layer 5 in the canister 4 and the fuel vapor in a gaseous layer within the canister 4, such as a space between the adsorbent layer 5 and the tank port of the canister 4. If the amount of the fuel vapor in the canister 4 cannot be correctly measured, it can be estimated by various ways as described in some examples below (Step S12). In some embodiments, when the amount of the fuel vapor in the canister 4 is equal to or higher than a predetermined reference value, the positive pressure type leakage detection method is selected (Steps S14, S18). And, when the amount of fuel vapor is less than the predetermined reference value, the negative pressure type leakage detection method is selected (Steps S14, S16). The reference value may be either a fixed value previously set or a variable value determined in response to environmental parameters, such as temperature. As described above, when a negative pressure is applied to the canister 4 for the purposes of leakage detection in a state where a large amount of the fuel vapor exists in the canister 4, the fuel vapor may be desorbed from the adsorbent to enter an equilibrium state. If so, desorption of the fuel vapor from the adsorbent causes an increase in the internal pressure of the inspection area 30 during the leakage detection. This will likely affect the accuracy of the leakage detection. Thus, in a state where the amount of the fuel vapor in the canister 4 is relatively large, using a positive pressure type leakage detection method can reduce a decrease in the accuracy of the leakage detection. For similar reasons, when the amount of fuel vapor in the canister 4 is relatively small, the negative pressure type leakage detection method may be more desirable.

In this embodiment of Step S12, the amount of the fuel vapor in the canister 4 is estimated from the concentration of the fuel vapor purged from the canister 4, which may also be referred to herein as the concentration of the purged fuel vapor. The concentration of the purged fuel vapor can be indirectly calculated from the air-fuel ratio of the gaseous mixture. The air-fuel ratio can be measured by an air-fuel ratio meter. The air-fuel ratio meter may include an oxygen sensor attached to an exhaust pipe. In some embodiments, a fuel concentration sensor such as a hydrocarbon concentration sensor may be provided, for instance, along the purge passage 39 so as to directly measure the concentration of the fuel vapor. Accordingly, the amount of the fuel vapor in the canister 4 can be estimated from the measured concentration of the fuel vapor, a value of which is also usually used to control the engine 6.

In some embodiments, the amount of fuel vapor in the canister 4 is calculated by using a relationship between the concentration of the purged fuel vapor and the amount of fuel vapor in the canister 4. In such case, the amount of the fuel vapor in the canister 4 can be calculated from the concentration of the purged fuel vapor at that time. It is thought that when atmospheric air flows from the outside through the canister 4, as the amount of the fuel vapor in the canister 4 becomes larger, the concentration of the purged fuel vapor increases. This relationship may be considered to have a fixed correlation. Alternatively, this relationship may be calculated from various parameters including the intake negative pressure of the engine 6 and the opening amount of the purge control valve 14 (e.g., the duty ratio of chopping control).

In some embodiments, an integrated amount of the purged fuel vapor is calculated from the concentration of the purged fuel vapor over a predetermined time. The amount of the fuel vapor in the canister 4 can be estimated from this integrated amount of the purged fuel vapor. This can accurately estimate the amount of the fuel vapor in the canister 4, with temporal changes being kept in mind. The integrated amount of the purged fuel vapor can also be calculated from the concentration of the purged fuel vapor, the flow rate of the purge flow through the purge control valve 14, also referred to as purge flow rate, and the purge time. The purge flow rate can be measured by a flow meter provided along the purge passage 39. Alternatively, the purge flow rate can be estimated or learned from the intake negative pressure of the engine 6 and the opening amount of the purge control valve 14. The integrated amount of the purged fuel vapor may be an integrated value calculated during a purge operation performed after the last refueling. Alternatively, the integrated amount may be an integrated value calculated during a purge operation carried out in the course of the last travelling. It is thought that the maximum amount of the fuel vapor accumulated in the canister 4 often occurs at refueling. Accordingly, when the fuel vapor is purged from the canister 4 after the refueling or during the last travelling, the amount of the fuel vapor in the canister 4 is likely less than the reference value described above.

At Step S20, it is determined whether the vapor pressure type leakage detection can be performed without forcibly applying pressure to the inspection area 30. For instance, in a situation where the closing valve 12 is open, or where the closing valve 12 is not provided in some embodiments, it may be determined whether the pressure in the area including both the canister 4 and the fuel tank 2, for example as measured by the pressure sensors 24, 28, is higher than a predetermined positive value or whether the pressure is less than a predetermined negative value. In a situation where the closing valve 12 is closed, it may be determined whether the pressure in the canister 4, and correspondingly to the inspection area 30, increases above a predetermined positive value or decreases below a predetermined negative value when the positive/negative pressure in the fuel tank 2 is applied to the canister 4 by opening the closing valve 12. For example, the predetermined positive value may be obtained by adding 5 kPa to the measured atmospheric pressure, and the predetermined negative value may be obtained by subtracting 5 kPa from the measured atmospheric pressure. When the pressure in the area is higher than the predetermined positive value or is less than the predetermined negative value, the vapor pressure type leakage detection may be performed (Step S23). The vapor pressure type leakage detection method usually does not require the operation of a pressure generation means, such as the aspirator 40 or a reversible pump 70 as described below, thereby reducing power consumption.

Figure 3:
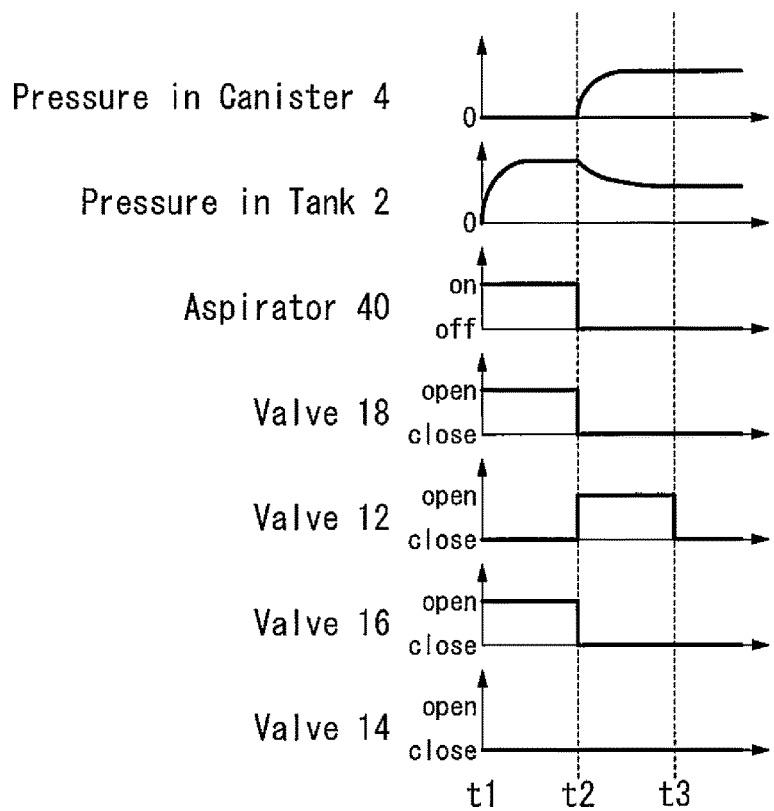
FIG. 3 is a timing diagram for carrying out a positive pressure type leakage detection method with respect to the canister of the fuel vapor processing system of FIG. 1.
Figure 4:
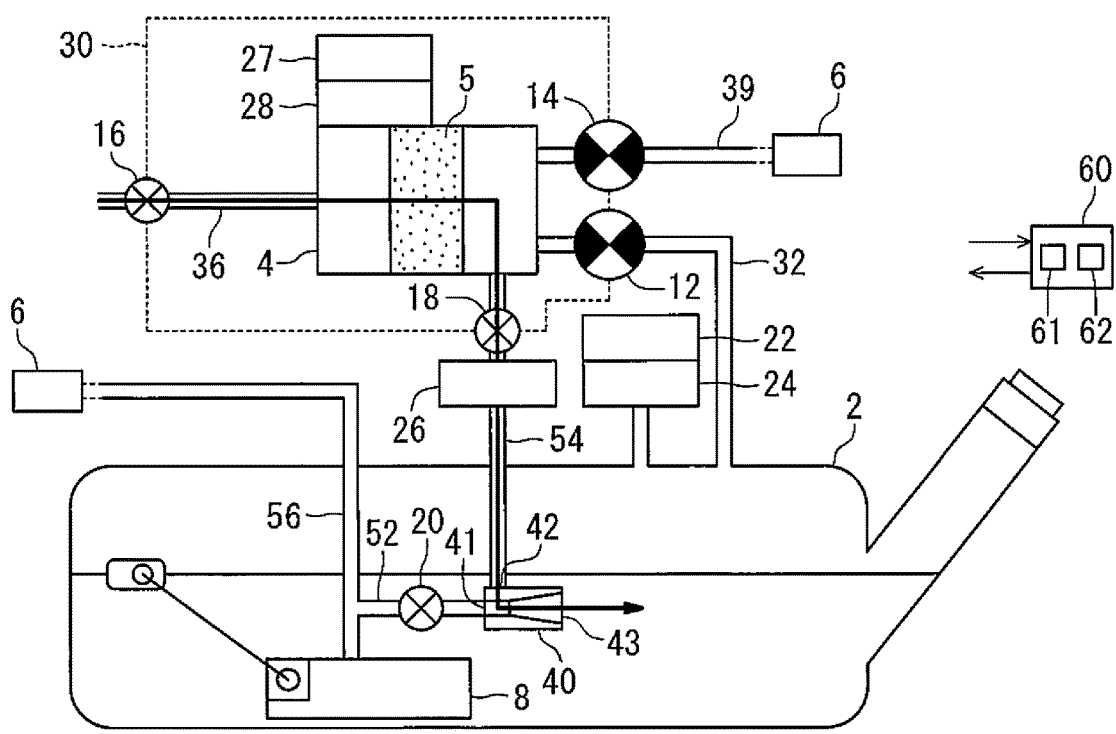
FIG. 4 is a schematic view of the fuel vapor processing system of FIG. 1 in a state where an aspirator introduces atmospheric air into a fuel tank such that the internal pressure of the fuel tank becomes positive.
Figure 5:
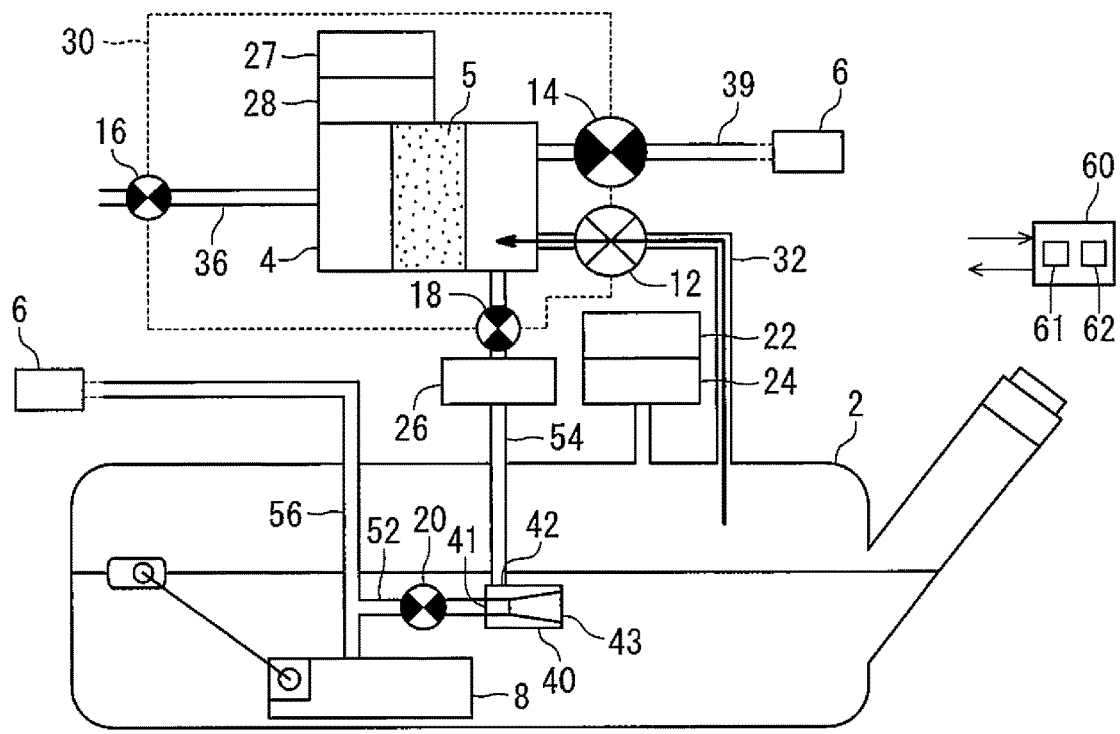
FIG. 5 is a schematic view of the fuel vapor processing system of FIG. 1 in a state where the positive pressure of the fuel tank is applied to the canister while a closing valve is open.
Figure 6:
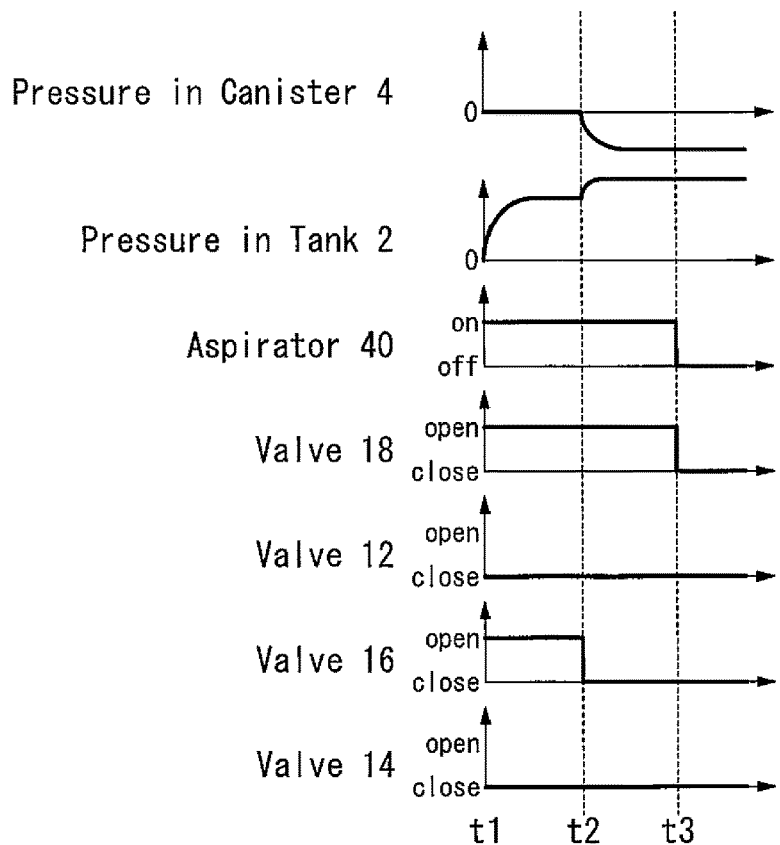
FIG. 6 is a timing diagram for carrying out a negative pressure type leakage detection method with respect to the canister of the fuel vapor processing system of FIG. 1.
Figure 7:
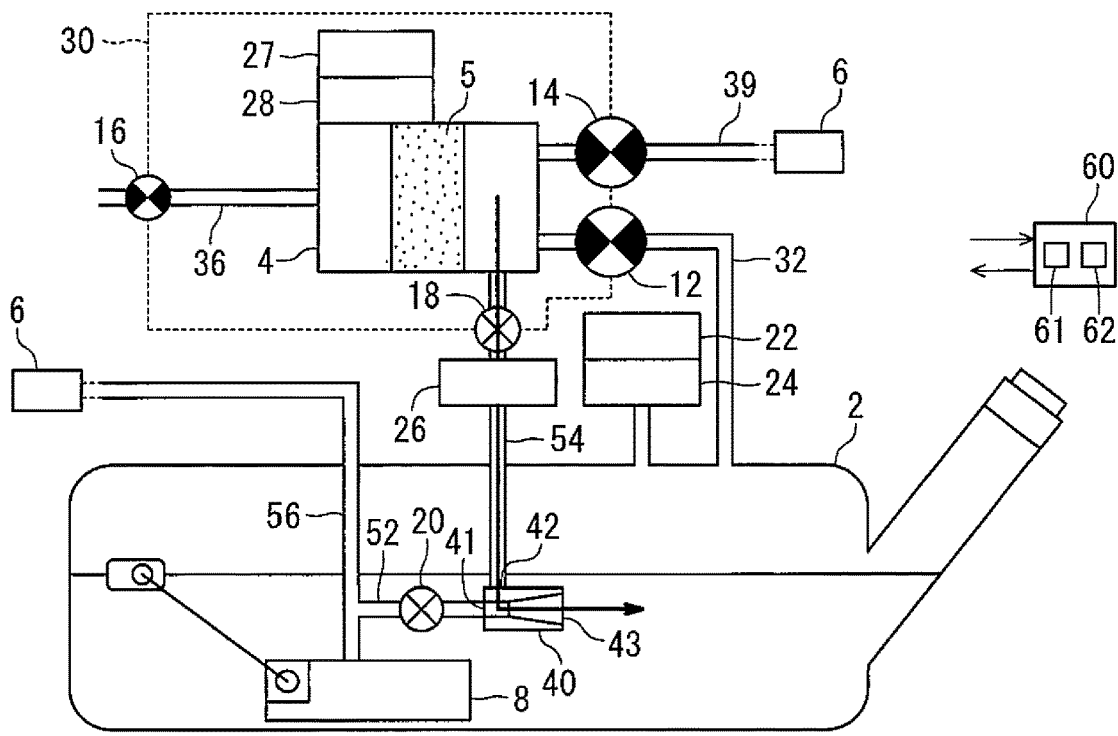
FIG. 7 is a schematic view of the fuel vapor processing system of FIG. 1 with the aspirator applying negative pressure to the canister.

When the vapor pressure type leakage detection cannot be performed and when the pressure generation type leakage detection is to be carried out (Step S22), a positive pressure or a negative pressure is forcibly applied to the inspection area 30 by using one or more various pressure generation means as described below. In a case where the positive pressure type leakage detection method is selected, the atmospheric valve 16 and the shut-off valve 18 are opened, and the aspirator 40 is driven so as to apply positive pressure to the fuel tank 2 via the canister 4 (at a time t1 in FIG. 3 and in a state shown in FIG. 4). Next, the aspirator 40 is stopped, the atmospheric valve 16 and the shut-off valve 18 are closed, and then the closing valve 12 is opened so as to apply the positive pressure to the canister 4 from the fuel tank 2 (at a time t2 in FIG. 3 and in a state shown FIG. 5). Finally, the closing valve 12 is closed (at a time t3 in FIG. 3), so as to sealingly close the inspection area 30. In case where the negative pressure type leakage detection method is selected, the atmospheric valve 16 and the shut-off valve 18 are opened, and the aspirator 40 is driven so as to apply positive pressure to the fuel tank 2 via the canister 4 (at time t1 in FIG. 6). Next, the atmospheric valve 16 is closed while operating the aspirator 40, so as to apply negative pressure to the canister 4 (at time t2 in FIG. 6 and in the state shown in FIG. 7). Finally, the aspirator 40 is stopped and the shut-off valve 18 is closed (at time t3 in FIG. 6). When the fluid is moved from the canister 4 to the fuel tank 2, a concentration distribution of the fuel vapor in the canister 4 is biased toward the fuel tank 2 side. In other words, the fuel vapor is back purged. Thus, the outflow of the fuel vapor from the canister 4 to the outside during parking, i.e., diurnal breathing loss, can be reduced.

Figure 8:
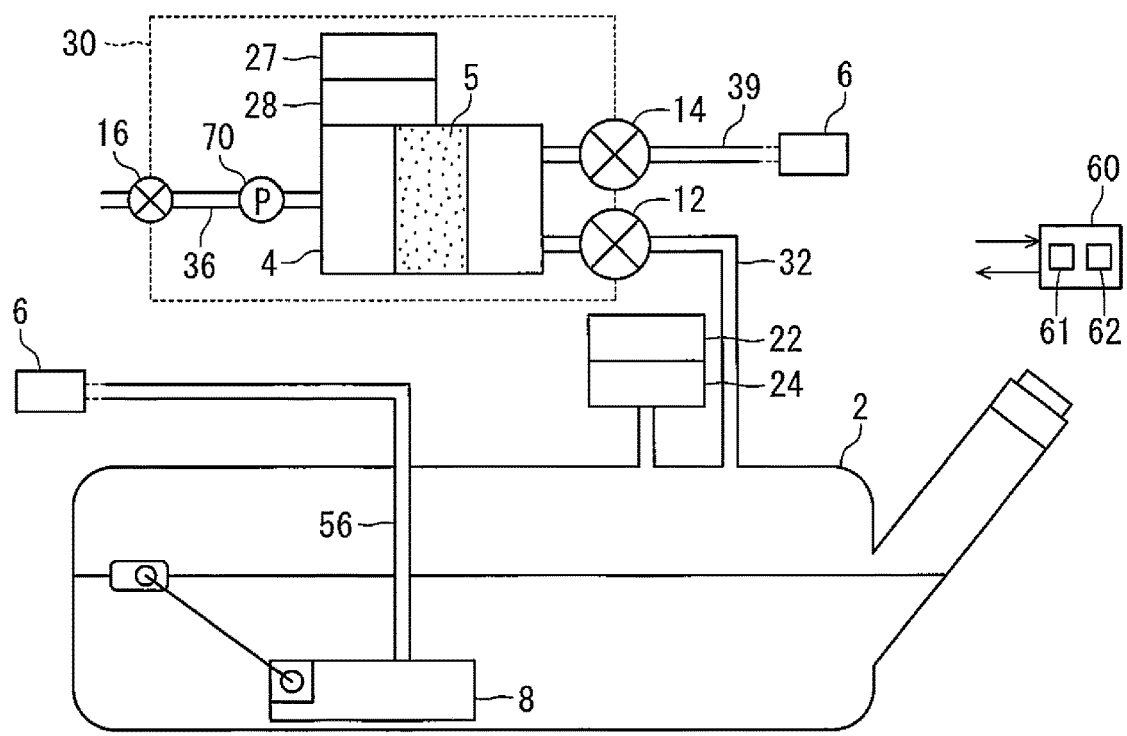
FIG. 8 is a schematic view of an embodiment of a fuel vapor processing system including a leakage detector in accordance with the principles described herein and having a positive/negative pressure changeable pump.
Figure 9:
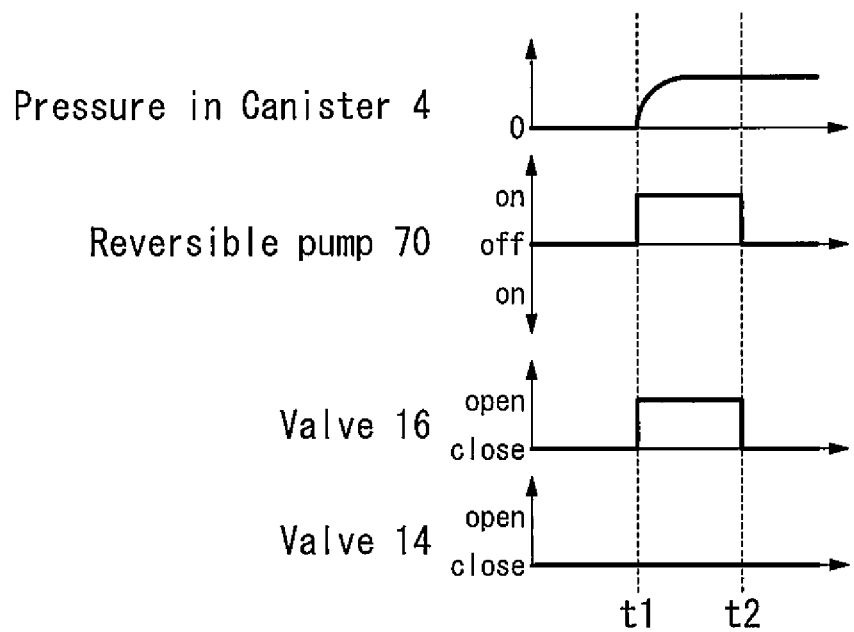
FIG. 9 is a timing diagram for applying positive pressure to the canister of the fuel vapor processing system of FIG. 8 by driving the positive/negative pressure changeable pump.
Figure 10:
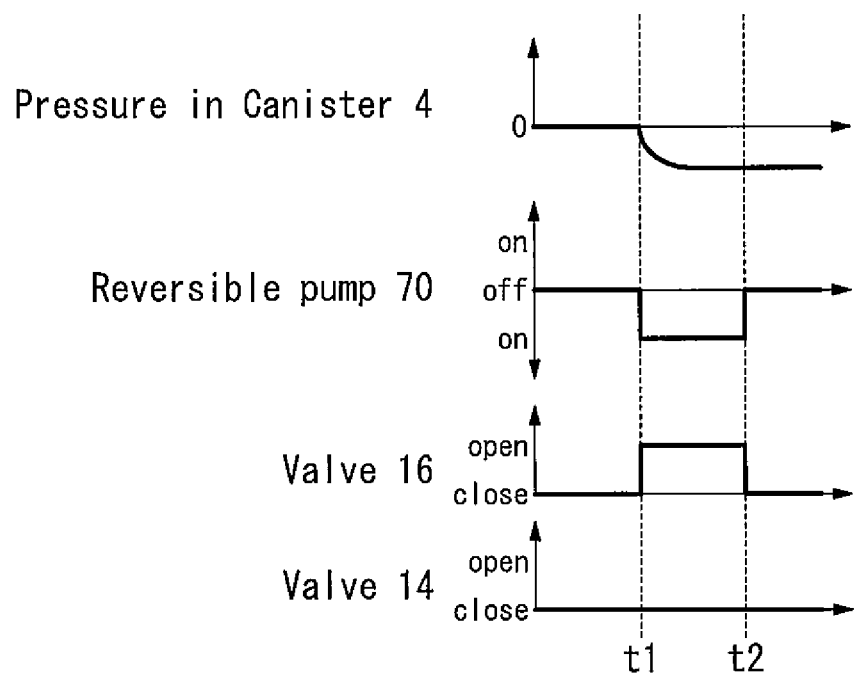
FIG. 10 is a timing diagram for applying negative pressure to the canister of the fuel vapor processing system of FIG. 8 by driving the positive/negative pressure changeable pump.

As shown in FIG. 8, in some embodiments, a reversible pump 70 configured to invert the discharge direction thereof may be provided along the atmospheric passage 36. The reversible pump 70 can function as a pressure generation means for the positive/negative pressure to be applied to the inspection area 30. If the reversible pump 70 is used, the aspirator 40 and the suction passage 54 can be omitted. The reversible pump 70 is included in a key-off pump module, together with both the atmospheric pump 16, which is configured to control fluid communication via the atmospheric passage 36, and the pressure sensor 28, which is configured to measure the internal pressure of the canister 4. In a case where a positive pressure type leakage detection method is selected, the atmospheric valve 16 can be opened and the reversible pump 70 can be driven to move the fluid toward the canister 4, so as to apply a positive pressure to the canister 4 (at time t1 in FIG. 9). When the internal pressure of the canister 4 reaches a predetermined positive value, the reversible pump 70 is stopped and the atmospheric valve 16 is closed (at time t2 in FIG. 9). In another case where the negative pressure type leakage detection method is selected, the atmospheric valve 16 is opened and the reversible pump 70 is driven to move the fluid toward the outside so as to apply negative pressure to the canister 4 (at time t1 in FIG. 10). When the internal pressure of the canister 4 reaches a predetermined negative value, the reversible pump 70 is stopped and the atmospheric valve 16 is closed (at time t2 in FIG. 10). In some embodiments, the closing valve 12 is open while the reversible pump 70 is driven, so as to apply the positive/negative pressure to the fuel tank 2 in addition to the canister 4. Due to this configuration, the leakage detection can be performed on an inspection area that includes both the fuel tank 2 and the canister 4.

Figure 11:
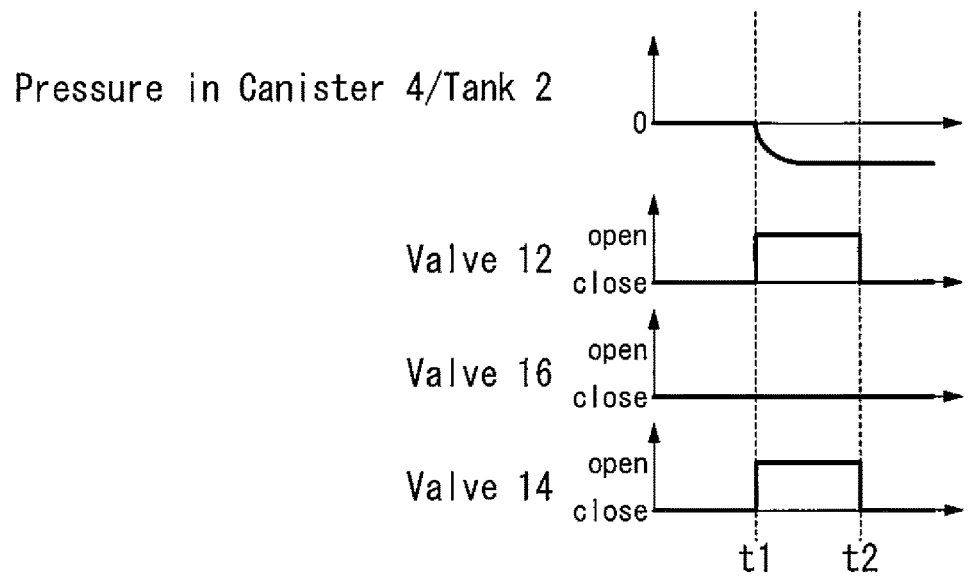
FIG. 11 is a timing diagram of an embodiment of a fuel vapor processing system in accordance with the principles described herein for applying negative pressure in an intake pipe to both a canister and a fuel tank while a purge control valve is open.

As shown in FIG. 11, in some embodiments, when a negative pressure type leakage detection method is selected, the purge control valve 14 is opened just after stopping the engine 6 or just after a key-off operation has been detected. This allows for the application of the negative pressure remaining in the intake pipe to the canister 4 (at time t1). Further, the negative pressure can be applied to the fuel tank 2 in addition to the canister 4 by opening the closing valve 12 at that time (at time t1). When the internal pressure of the canister 4 reaches a predetermined negative value, the closing valve 12 and the purge control valve 14 are closed (at time t2). In some embodiments, the closing valve 12 is kept open after closing the purge control valve 14, so that a leakage detection may be performed on an inspection area that includes both the canister 4 and the fuel tank 2.

Figure 12:
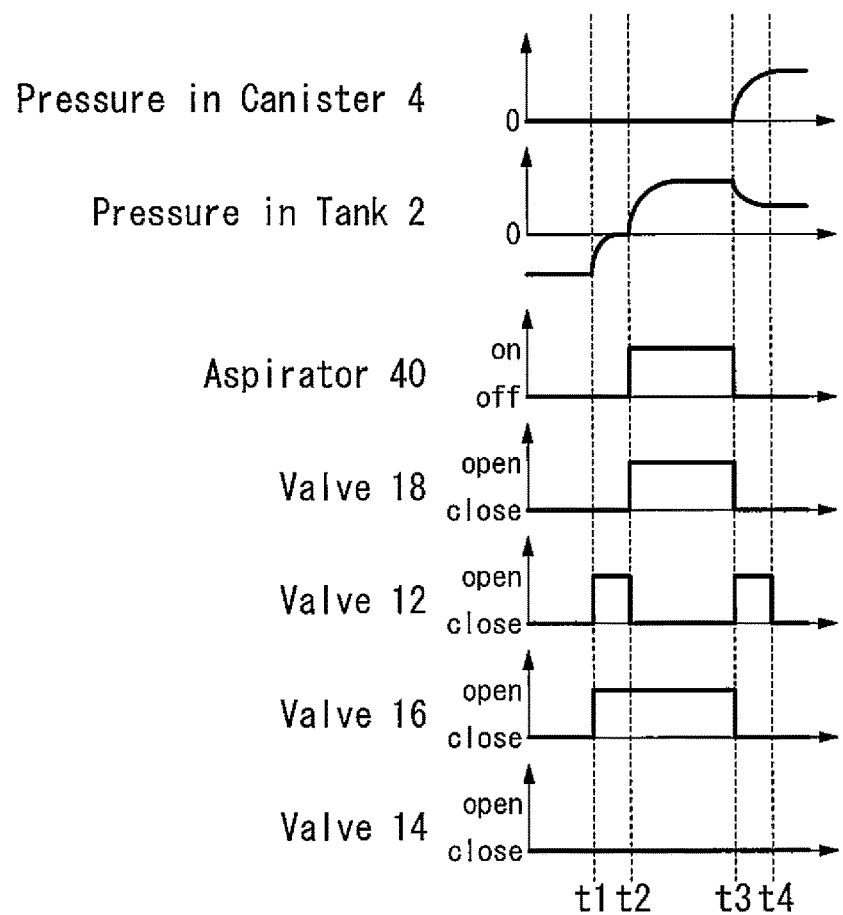
FIG. 12 is a timing diagram of an embodiment of a fuel vapor processing system in accordance with the principles described herein for releasing negative pressure spontaneously generated in a fuel tank and then applying positive pressure to a canister.
Figure 13:
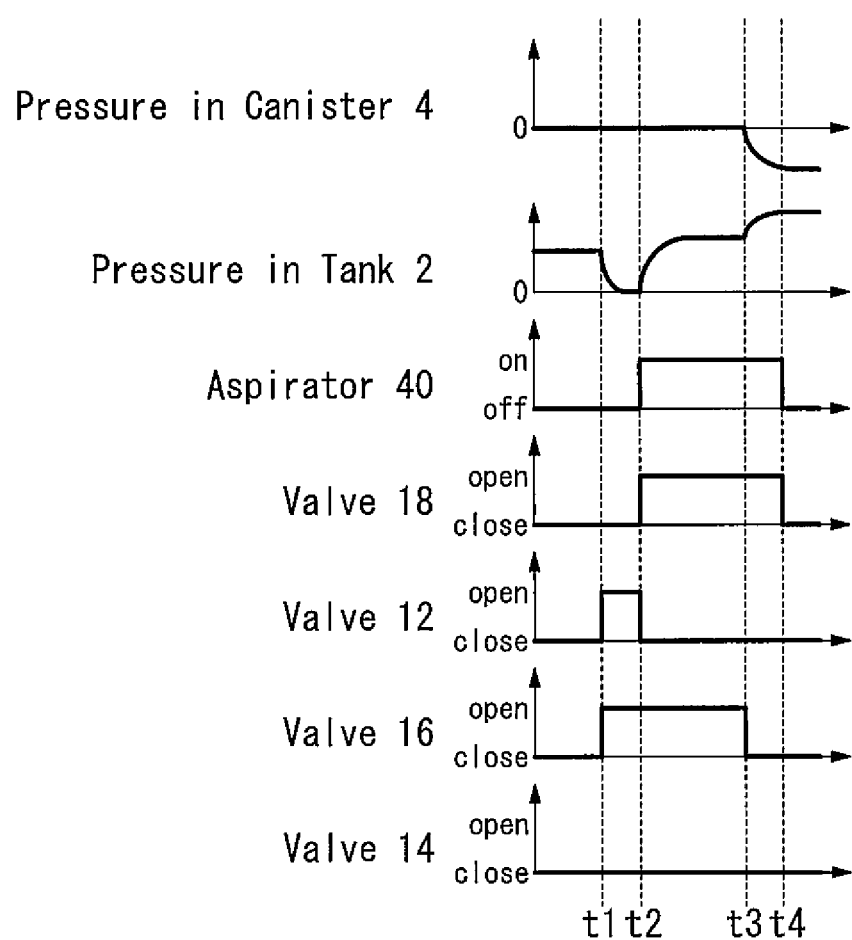
FIG. 13 is a timing diagram of an embodiment of a fuel vapor processing system in accordance with the principles described herein for releasing positive pressure generated in a fuel tank and then applying negative pressure to a canister.

There is a possibility that the positive pressure type leakage detection method is selected based on the amount of the fuel vapor in the canister 4 even though the negative pressure in the fuel vapor processing system is sufficient for the vapor pressure type leakage detection. In a case where the amount of the positive/negative pressure necessary for the leakage detection is different from the amount of the positive/negative pressure available in the system, a vapor pressure type leakage diagnosis with respect to only the fuel tank 2 can be performed. However, a vapor pressure type leakage detection on the portion of the inspection area that includes the canister 4 generally cannot be carried out. In such a situation, a pressure generation type leakage detection on the portion of the inspection area that includes the canister 4 can be performed after releasing the pressure. As shown in FIG. 12, when a positive pressure type leakage detection method is selected in a state where the internal pressure of the fuel tank 2 is negative, the atmospheric valve 16 and the closing valve 12 are opened. Thus, atmospheric air flows into the fuel tank 2 through the atmospheric passage 36, the canister 4, and the vapor passage 32 so as to release the negative pressure in the fuel tank 2 (at time t1 in FIG. 12). Then, a positive pressure is applied to the fuel tank 2 and the canister 4 by opening the shut-off valve 18, closing the closing valve 12, and operating the aspirator 40 (at time t2 in FIG. 12). Next, the aspirator 40 is stopped, the shut-off valve 18 and the atmospheric valve 16 are closed, and the closing valve 12 is opened so as to apply a positive pressure to the canister 4 (at time t3 in FIG. 12). Finally, the inspection area 30 is sealingly closed by closing the closing valve 12 (at time t4 in FIG. 12). As shown in FIG. 13, when a negative pressure type leakage detection method is selected in a state where the internal pressure of the fuel tank 2 is positive, the atmospheric valve 16 and the closing valve 12 are opened (at time t1). Thus, the gaseous mixture flows from the fuel tank 2 to the outside via vapor passage 32, the canister 4, and the atmospheric passage 36. This releases the positive pressure in the fuel tank 2. Then, atmospheric air is introduced into the fuel tank 2 by opening the shut-off valve 18, closing the closing valve 12, and driving the aspirator 40 (at time t2 in FIG. 13). Next, the atmospheric valve 16 is closed so as to move the fluid from the canister 4 to the fuel tank 2. In other words, to apply negative pressure to the canister 4 (at time t3 in FIG. 13). Finally, the shut-off valve 18 is closed and the aspirator 40 is stopped such that the inspection area 30 is sealingly closed (at time t4 in FIG. 13).

As shown in FIG. 2, the ECU 60 is configured to perform a leakage detection of fuel vapor from the inspection area 30 in accordance with the previously determined diagnosis method, e.g., the positive/negative pressure type leakage detection methods at either Step S22 or Step S23. The decision criteria for leakage detection may be set based on the pressure change generated in a state where the inspection area 30, which may optionally include the fuel tank 2 and the pipes forming passages in addition to the canister 4, has an opening with a predetermined size. In some embodiments, the ECU 60 is configured to determine that the inspection area 30 has an opening when the pressure measured, for instance, by the pressure sensor 28, increases or decreases toward atmospheric pressure at a faster speed than a reference speed. For example, in a case where a negative pressure type leakage detection method is to be used, the ECU 60 can determine that fluid leaks out from the inspection area 30 when the pressure in the inspection area 30 increases toward the atmospheric pressure at a higher rate than a predetermined reference rate. In a case where a positive pressure type leakage detection method is to be used, the ECU 60 can determine that fluid leaks out from the inspection area 30 when the pressure in the inspection area 30 decreases toward atmospheric pressure at a faster speed than the predetermined reference speed.

In some embodiments, the ECU 60 is configured to determine that the inspection area 30 has an opening when the pressure measured by the pressure sensor 28 decreases at a slower speed than a predetermined reference speed. This determination is made while a negative pressure is applied to the inspection area 30. In a case of a positive pressure type leakage detection method, it may be determined that fluid leaks out from the inspection area 30 when the pressure measured by the pressure sensor 28 increases at a slower speed than a predetermined value. This determination is made while a positive pressure is applied to the inspection area 30.

In some embodiments, the ECU 60 is configured to light a warning lamp in the vehicle after the start of the engine 6 if a leakage is detected. Thus, a driver of the vehicle can perceive the leakage from the fuel vapor processing system.

The leakage detector disclosed herein is not limited to the above described embodiments, and can be modified in various ways without departing from the gist of the invention. For example, in some embodiments, a leakage detector for a fuel vapor processing system having a canister includes a sealing system and a control unit. The sealing system is connected to the canister and is configured to sealingly close an inspection area including the canister. The control unit comprises and is implemented by at least one programmed processor. The control unit is configured to calculate an amount of a fuel vapor in the canister. The control unit is also configured to select a leakage detection method from a positive pressure type and a negative pressure type depending on the calculated amount of fuel vapor in the canister. The control unit is also configured to perform the selected type of leakage detection method based on temporal changes in an internal pressure of the inspection area closed by the sealing system. In accordance with this embodiment, it is able to reduce a decrease in the accuracy of the leakage detection, which is often caused when there is a large amount of fuel vapor in the canister.

In some embodiments, the control unit is configured to select the positive pressure type when the calculated amount of fuel vapor in the canister is equal to or higher than a predetermined value, and is configured to select the negative pressure type when the calculated amount of the fuel vapor in the canister is less than the predetermined value. In accordance with this configuration, it is possible to easily decide which of the positive pressure type and the negative pressure type to use by comparing the calculated amount of the fuel vapor to the predetermined value.

In some embodiments, the control unit is configured to calculate the amount of fuel vapor in the canister from a concentration of fuel vapor purged from the canister. In accordance with this configuration, the amount of the fuel vapor in the canister can be calculated from the concentration of the fuel vapor, which is also normally used to control the engine.

In some embodiments, the control unit is configured to calculate the amount of fuel vapor in the canister by using a relationship between the concentration of the fuel vapor purged from the canister and the amount of the vapor in the canister. In accordance with this configuration, the amount of fuel vapor in the canister can be easily calculated from the concentration of the fuel vapor at that time.

In some embodiments, the control unit is configured to calculate an integrated amount of fuel vapor purged from the canister within a predetermined period of time. This integral can be calculated from the concentration of the fuel vapor. The control unit is also configured to calculate the amount of fuel vapor in the canister from the integrated amount of the fuel vapor purged from the canister within the predetermined period of time. In accordance with this configuration, the amount of fuel vapor in the canister can be accurately calculated with temporal changes kept in mind.

In some embodiments, the leakage detector includes a positive pressure generator configured to apply a positive pressure to the inspection area. The leakage detector also includes a negative pressure generator configured to apply a negative pressure to the inspection area. The control unit is configured to selectively operate the positive pressure generator or the negative pressure generator. In accordance with this configuration, a forcible application of a positive or negative pressure can be easily carried out.

In some embodiments, the control unit is configured to determine whether an internal pressure of the fuel vapor processing system is sufficient to perform the selected leakage detection method without applying pressure. The control unit is also configured to carry out the selected type of leakage detection method without operating either the positive pressure generator or the negative pressure generator if it is determined that the internal pressure is sufficient enough. In accordance with this configuration, the leakage detection can be performed while saving the amount of power that would normally be used for operating the positive pressure generator and the negative pressure generator.

In some embodiments, the negative pressure generator is configured to make a fluid flow from the canister to a fuel tank. As a result, a negative pressure may be applied to the canister. In accordance with this configuration, a concentration distribution of the fuel vapor in the canister is biased toward the fuel tank side so that the outflow of fuel vapor from the canister toward the outside of the fuel vapor processing system can be suppressed.

In some embodiments, the positive pressure generator is configured to make a fluid flow from the outside to the inside of the fuel tank through the canister. This may be done to apply a positive pressure to the fuel tank. When the positive pressure generator is stopped, the fuel tank is made to be in fluid communication with the canister, such that the fluid may flow from the fuel tank to the canister. This may be done to apply a positive pressure to the canister. In accordance with this configuration, a concentration distribution of the fuel vapor in the canister is biased toward the fuel tank side. As a result, the outflow of the fuel vapor from the canister to the outside of the fuel vapor processing system can be suppressed.

In some embodiments, the leakage detector includes an aspirator driven by fuel discharged from a fuel supply pump. The aspirator is configured to suction a fluid from the canister to the fuel tank. In accordance with this embodiment, the system is able to apply a positive pressure or a negative pressure to the canister by using the fuel discharged from the fuel supply pump.

In some embodiments, the leakage detector includes a reversible pump connected to an atmospheric port of the canister. The reversible pump functions as both the positive pressure generator and the negative pressure generator. In accordance with this embodiment, the single reversible pump can selectively apply both the positive pressure and the negative pressure to the canister when necessary.

What is claimed is:

1. A leakage detector for a fuel vapor processing system having a canister, the leakage detector comprising:
   a sealing system connected to the canister and configured to selectively seal an inspection area that includes the canister; and
   a control unit comprising a programmed processor, wherein:
      the control unit is configured to calculate an amount of a fuel vapor in the canister,
      the control unit is configured to select a leakage detection method from a group consisting of a positive pressure type method and a negative pressure type method based on the calculated amount of fuel vapor in the canister, and
      the control unit is configured to perform the selected leakage detection method and to determine whether a leak is present based on a change in an internal pressure of the inspection area closed by the sealing system over a period of time.

2. The leakage detector of claim 1, wherein:
   the control unit is configured to select the positive pressure type method when the calculated amount of fuel vapor in the canister is equal to or higher than a predetermined value, and
   the control unit is configured to select the negative pressure type method when the calculated amount of fuel vapor in the canister is less than the predetermined value.

3. The leakage detector of claim 1, wherein the control unit is configured to calculate the amount of fuel vapor in the canister from a concentration of the fuel vapor purged from the canister.

4. The leakage detector of claim 3, wherein the control unit is configured to calculate the amount of fuel vapor in the canister based on a relationship between the concentration of the fuel vapor purged from the canister and a previously determined amount of fuel vapor in the canister.

5. The leakage detector of claim 3, wherein:
   the control unit is configured to calculate an integrated amount of fuel vapor purged from the canister within a predetermined time from the concentration of the fuel vapor purged from the canister, and
   the control unit is configured to the calculate the amount of fuel vapor in the canister from the integrated amount of the fuel vapor purged from the canister.

6. The leakage detector of claim 1, further comprising:
   a positive pressure generator configured to apply a positive pressure to the inspection area; and
   a negative pressure generator configured to apply a negative pressure to the inspection area,
   wherein the control unit is configured to selectively operate the positive pressure generator, and
   wherein the control unit is configured to selectively operate the negative pressure generator.

7. The leakage detector of claim 6, wherein:
   the control unit is configured to determine whether an internal pressure of the fuel vapor processing system is sufficient to perform the selected leakage detection method without applying pressure, and
   the control unit is configured to perform the selected leakage detection method without operating the positive pressure generator or the negative pressure generator when it is determined that the internal pressure is sufficient.

8. The leakage detector of claim 6, further comprising:
   a reversible pump connected to an atmospheric port of the canister,
   wherein the positive pressure generator and the negative pressure generator together form at least a part of the of the reversible pump.

9. The leakage detector of claim 6, wherein the negative pressure generator is configured to generate a fluid flow from the canister to a fuel tank so as to apply the negative pressure to the canister.

10. The leakage detector of claim 9, wherein the negative pressure generator includes an aspirator driven by a fuel discharged from a fuel supply pump.

11. The leakage detector of claim 6, wherein:
the positive pressure generator is configured to cause a fluid flow from an outside, through the canister, and to a fuel tank, so as to apply the positive pressure to the fuel tank, and
when the positive pressure generator has been stopped after applying the positive pressure to the fuel tank, the fuel tank is placed in fluid communication with the canister such that fluid flows from the fuel tank to the canister so as to apply the positive pressure to the canister.

12. The leakage detector of claim 11, wherein the positive pressure generator includes an aspirator driven by a fuel discharged from a fuel supply pump.

\* \* \* \* \*